United States Patent
Kotani et al.

[11] Patent Number: 5,765,058
[45] Date of Patent: Jun. 9, 1998

[54] CAMERA HAVING MULTIPLE SPEED FILM DRIVE

[75] Inventors: Noriyasu Kotani, Tokyo; Noboru Akami, Kanagawa-ken; Daiki Tsukahara, Tokyo, all of Japan

[73] Assignee: Nikon Corporation, Tokyo, Japan

[21] Appl. No.: 627,075

[22] Filed: Apr. 3, 1996

[30] Foreign Application Priority Data

Apr. 25, 1995 [JP] Japan ................. 7-101277

[51] Int. Cl.$^6$ .................. G03B 7/00; G03B 17/24
[52] U.S. Cl. .................. 396/210; 396/311
[58] Field of Search ............... 354/106, 173.1, 354/173.11; 396/210, 311, 312, 319; 242/334, 334.1, 352.5, 356.3

[56] References Cited

U.S. PATENT DOCUMENTS

| | | | |
|---|---|---|---|
| 4,063,139 | 12/1977 | Miller | 318/331 |
| 4,456,201 | 6/1984 | Frias et al. | 242/203 |
| 4,969,000 | 11/1990 | Ohara et al. | 354/173.1 |
| 5,307,100 | 4/1994 | Kubo | 354/105 |
| 5,464,167 | 11/1995 | Fujisawa et al. | 242/334 |
| 5,508,767 | 4/1996 | Kazumi et al. | 354/106 |
| 5,530,503 | 6/1996 | Takahashi et al. | 354/173.1 |
| 5,548,359 | 8/1996 | Wakabayashi | 354/21 |

FOREIGN PATENT DOCUMENTS

| | | |
|---|---|---|
| 5-34777 | 2/1993 | Japan . |
| 7-20526 | 1/1995 | Japan . |

*Primary Examiner*—Safet Metjahic
*Assistant Examiner*—Christopher E. Mahoney
*Attorney, Agent, or Firm*—Oliff & Berridge, PLC

[57] ABSTRACT

A camera having a multiple speed film driving mechanism that can accurately read film data on a film cartridge. The camera has a motor that drives a spool axis of the film cartridge, and a reading device that can read film data stored on a recording medium on the film cartridge. When the film cartridge is loaded into the camera, the reading device reads film data on the recording medium that is rotated together with the spool axis at a first speed. When film data reading is finished, the spool axis is rotated at a second speed to feed the film into the camera. A motor drive control circuit and CPU controls spool axis rotation at multiple speeds and directions.

12 Claims, 2 Drawing Sheets

CAMERA HAVING MULTIPLE SPEED FILM DRIVE

BACKGROUND OF THE INVENTION

1. Field of the Invention

The present invention relates to an apparatus and method in a camera for reading film data recorded on a recording medium on a film cartridge during rotation of the film cartridge spool axis.

2. Description of Related Art

In many types of cameras, a film cartridge containing unexposed film is loaded into the camera and film is fed through the camera for exposure. Film data can be recorded on a recording medium on the outside of the cartridge.

In one type of known film cartridge, a recording medium rotates integrally with the spool axis of the cartridge on which film is rolled. Film data is recorded in a bar code pattern on the recording medium. In cameras which use this type of film cartridge, film is fed by rotating the spool axis using a motor. At the same time the bar code pattern is read during rotation of the spool axis. In other words, the recording medium rotates integrally with the spool axis and the bar code pattern is read, using a photo reflector or the like, and film data is recognized by the camera's circuitry.

However, problems occur when attempting to feed film at the same time as reading film data using the same spool axis rotational speed. For example, a bar code pattern reading error is more likely to occur because the recording medium rotates at the same high spool speed as the film feed. Conversely, when the rotation speed of the spool axis is low to more accurately read film data, film feed speed is slower resulting in inconvenience for the camera user.

SUMMARY OF THE INVENTION

An object of the present invention is to provide a camera with a fast film feed and rewind speed that also accurately reads film data recorded on the film cartridge.

To achieve the aforementioned objective, a camera according to the present invention has a driving means that rotationally drives the spool axis of a film cartridge at two different speeds in order to read film data as well as feed or rewind film. A reading means reads the film data from the film data recording medium. The film data recording medium is driven integrally with the film spool axis.

The present invention also includes a driving control means that controls the rotation direction and speed of the spool axis. When the film cartridge is loaded, the reading means is activated and the spool axis is driven at a first speed in the film rewind direction by the driving means. When film data reading is finished, the spool axis is rotated in the film feeding direction by the driving means to feed film from the film cartridge.

With the camera of the present invention, when the film cartridge is loaded, film data is read together with the rotation of the spool axis at a first lower speed in the film rewind direction. When film data reading is finished, the spool axis is driven in the film feeding direction at a second higher speed. When all frames of the film have been exposed, the spool axis is driven at the second higher speed in the film rewind direction.

Other objects, advantages and salient features of the invention will become apparent from the detailed description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

A preferred embodiment of the invention will be explained hereafter with reference to FIGS. 1 and 2.

Figure 1:
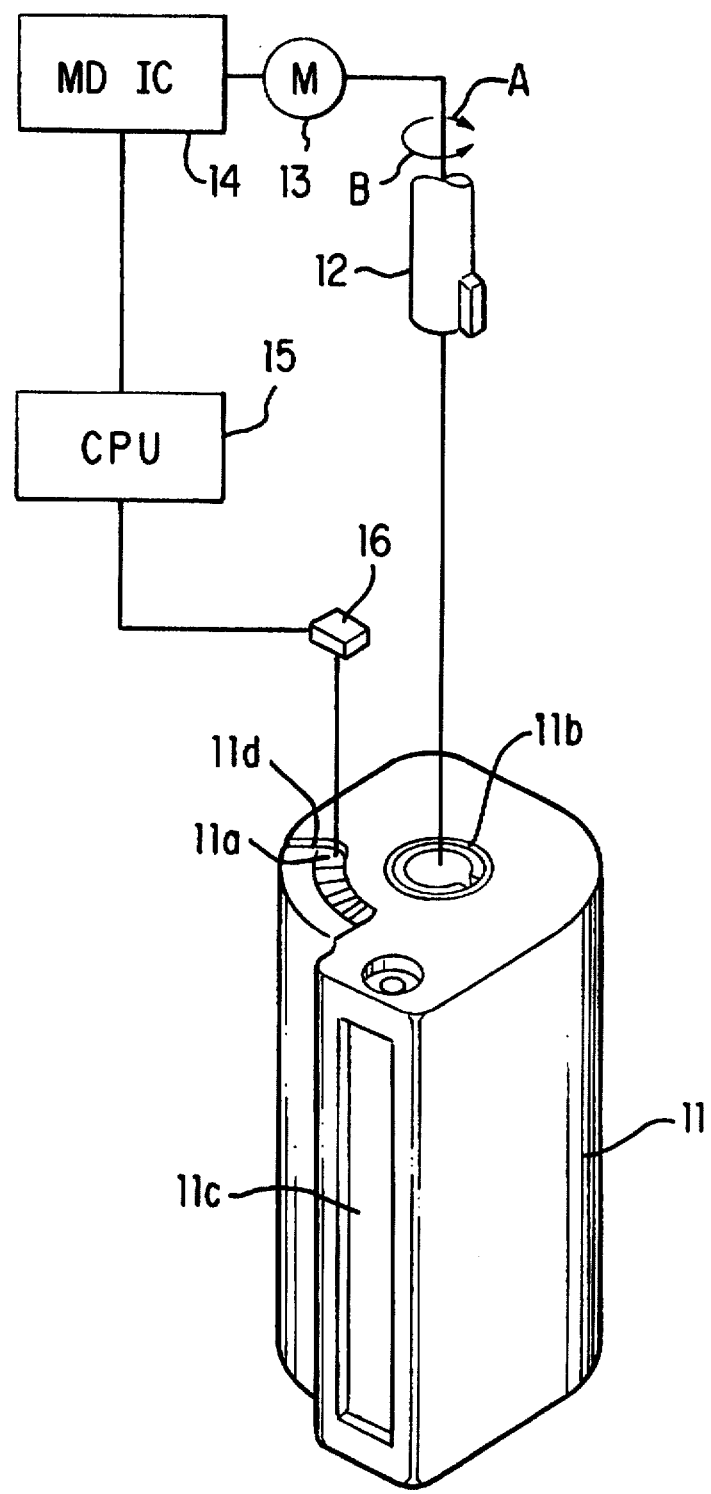
FIG. 1 is an exploded view of a preferred embodiment of a camera according to the present invention.

FIG. 1 shows the configuration of a camera film driving device according to the present invention. Film cartridge 11 is provided with spool axis 11b about which film, which is not shown in the figure, is wrapped in a known manner. Film cartridge 11 has a data disk 11a that rotates integrally with spool axis 11b, and a cartridge shield door 11c that is positioned where the film exits the cartridge. When film cartridge 11 is loaded into the camera, a spool drive fork 12 meshes with the upper meshing component of the spool axis 11b. Spool drive fork 12 is driven by means of a motor 13, through a gear system which is not shown in the figure. Spool axis 11b and data disk 11a rotate integrally. When spool axis 11b is rotated in the direction of arrow A, the film feed direction, film is fed from film cartridge 11 into the camera. When spool axis 11b is rotated in the direction of arrow B, the film rewind direction, the film is rewound on spool axis 11b. Motor 13 rotationally drives spool drive fork 12, and is connected to a CPU 15 through the MD IC (Motor Drive IC) 14.

Data disk 11a contains film data such as the film sensitivity, frame number, and so forth. This data, in the preferred embodiment, is recorded in bar code form. A portion of the bar code is exposed from window 11d that is formed on the upper surface of film cartridge 11. A photo-reflector 16 optically reads the bar code pattern and produces a signal that is input into CPU 15. The MD IC 14 produces a low current drive, such as a pulse current drive or a low voltage drive, to drive motor 13 at a low speed when photoreflector 16 is reading the bar code pattern on the data disk 11a. MD IC 14 produces a second higher drive signal, such as full current, to drive motor 13 at speed higher than the first speed, when film is fed and bar code pattern reading is finished.

The bar code pattern includes front end data that indicates the beginning of the film data, and trailing end data that indicates the end of the film data. Based on this front end and trailing end data, a determination can be made whether bar code pattern reading is finished.

As described above in the preferred embodiment, spool axis 11b rotates in the rewind direction for reading film data on data disk 11a. The film data is accurately read by photo-reflector 16 because motor 13 drives at a lower speed than during normal film rewind. Meanwhile, at film rewind, motor 13 is driven at a higher speed than at the time of film data reading to speed up the rewind process.

Spool axis 11b is rotated in the rewind direction when reading film data to ensure that film is not fed into the camera. It would also be possible to read the data during film loading, when the film is fed from the film cartridge. In this case, at the time of loading, the spool axis is rotated in a film feed direction at a low speed. When data is not being read (for example, at the time of rewinding), rotation of the spool axis can be at a higher speed.

In addition, instead of film data being recorded on a data disk, film data may also be magnetically recorded on a leader component of the film. The data may be read by means of a magnetic head at the same time as film feeding.

The spool axis is rotated at a low speed when data is read, and only during actual film feeding is the spool axis rotated at a high speed. In addition, the film data could also be recorded on a compact disc.

Figure 2:
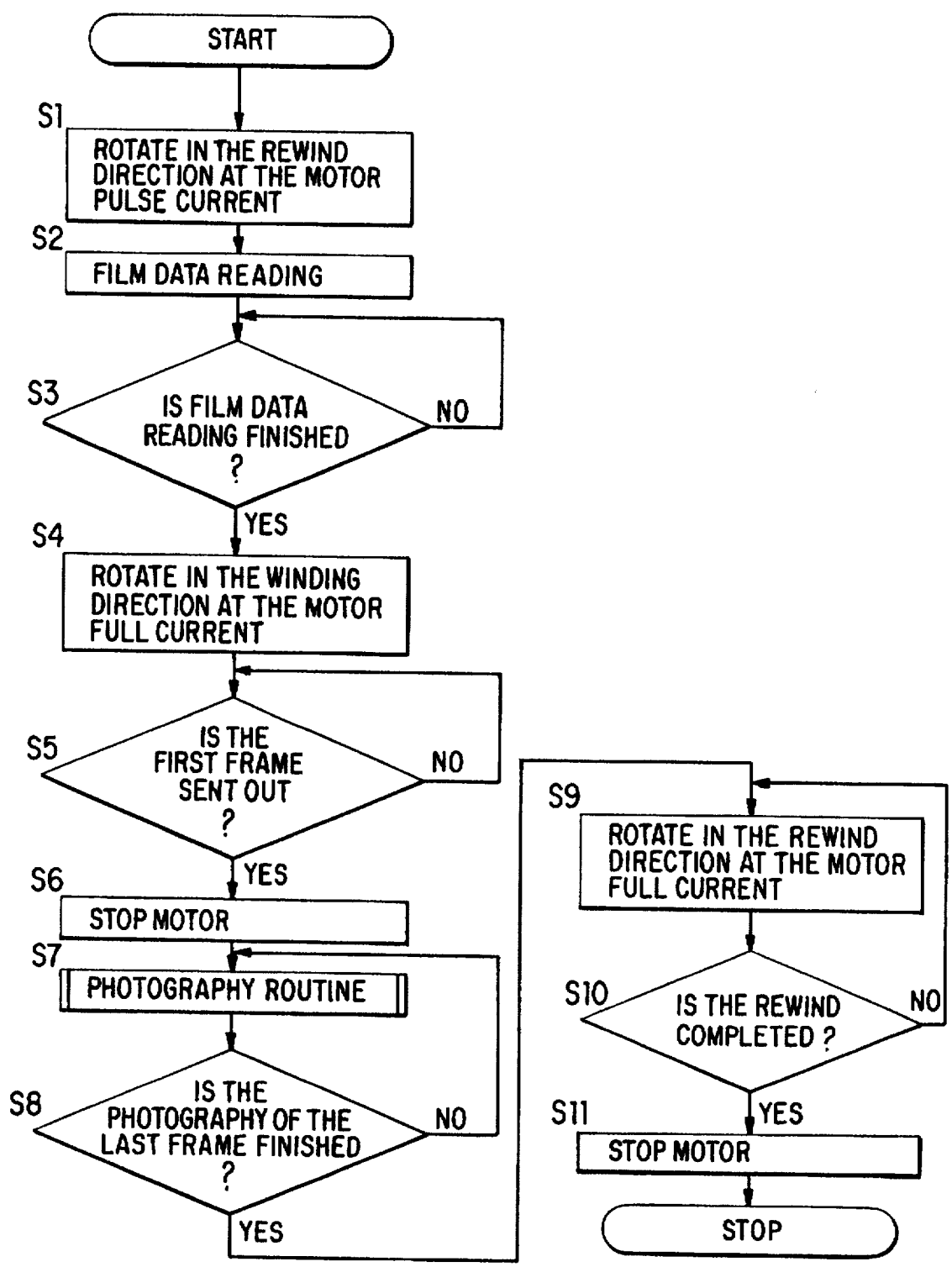
FIG. 2 is a flow chart that explains the operation of the camera of the present invention.

The flow chart of FIG. 2 illustrates the operation a preferred embodiment of a camera according to the present invention. FIG. 2 depicts the flow of events until the first frame of the film is opposite the aperture of the camera after film cartridge 11 is loaded into the camera. When film cartridge 11 is loaded into the camera and the cartridge hatch is closed, CPU 15 proceeds to step 1. At step 1, motor 13 is driven at a low speed by a pulse current drive as instructed through MD IC 14, and spool axis 11b is rotationally driven in the B direction (the rewind direction). Data disk 11a rotates in the B direction integrally with the spool axis 11b, and the bar code pattern is read. Because the rotation direction of spool axis 11b is in the rewind direction, film is not fed into the camera. At step 2, the bar code pattern on data disk 11a is read by photo-reflector 16, and film data is recognized in CPU 15.

At step 3, after reading the trailing end data of the aforementioned bar code pattern, a determination is made whether film data reading is finished. If so, the program proceeds to step 4. At step 4, motor 13 is stopped momentarily and after spool axis 11b stops, motor 13 is rotated at full current at a second faster speed driving spool axis 11b in the A direction (feeding direction). Film is fed from film cartridge 11 into the camera. The film fed into the camera is led through the aperture and wound on a film wind-up spool (which is not shown in the attached figure). At step 5, a determination is made whether the first frame of the film is opposite the aperture. When it is opposite, the program proceeds to step 6 where motor 13 is stopped.

Step 7 is the photographic routine for each frame, where range finding, photometry, lens drive, light exposure, etc. is performed. After the photography of each frame is finished at step 7, the program proceeds to step 8 where a determination is made whether the photography of the final frame is finished. If photography of the final frame is finished, the program proceeds to step 9. If photography of the final frame is not finished, the program returns to step 7, and step 7 and 8 are repeated until photography of the final frame is finished.

At step 9 motor 13 is again driven at full current, and spool axis 11b is rotationally driven in the B direction (the rewind direction) at the same high speed as at the aforementioned film feeding, and film is rewound into film cartridge 11. At step 10, all of the film is retrieved into film cartridge 11 and a determination is made whether film rewinding is finished. If rewinding is not finished, the program returns to step 9, and steps 9 and 10 are repeated until the rewinding is completed. If the rewinding is complete, then the program proceeds to step 11 where motor 13 is stopped.

As described above, according to the present invention, film data recorded on film data recording medium, is read when the spool axis is initially rotated in the film rewind direction at a lower speed. Reading of film data through the reading means can be more accurately accomplished because the driving means rotates the spool axis at the first speed which is slower than the normal film rewind speed. Film feeding and rewind, which are not done in conjunction with reading film data, are faster because the spool axis is driven at a higher second speed.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A camera, comprising:

a motor to rotationally drive a spool axis in a film cartridge containing film;

a sensor to read film data from a recording medium adapted to move with rotation of said spool axis of said film cartridge;

a central processing unit for producing motor drive signals; and a motor drive circuit to control speed and direction of rotation of said motor based on said motor drive signals from said central processing unit, wherein said motor drive circuit issues drive signals to said motor to drive said spool axis in a film rewind direction at a first speed to read film data and in a film feeding direction at a second speed after said film data has been read.

2. The camera according to claim 1, wherein said sensor comprises a photo-reflective device adapted to optically read film data stored on said recording medium, said film data being recorded in a bar code pattern on said recording medium.

3. The camera according to claim 2, wherein said recording medium is a disk that integrally rotates with said spool axis.

4. The camera according to claim 1, wherein said sensor comprises a magnetized head adapted to read magnetically recorded film data on said recording medium.

5. A camera according to claim 1, wherein said first speed is slower than said second speed.

6. A multiple speed film drive, comprising:

driving means for rotationally driving a spool axis of a film cartridge containing film;

reading means for reading film data stored on a film data recording medium, said film data recording medium being adapted to move with rotation of said spool axis;

processing means for producing drive signals; and driving control means for controlling said spool axis rotation based on said drive signals, said driving control means causing said driving means to drive said spool axis in a film rewind direction at a first speed while said reading means is reading film data and in a film feeding direction at a second speed after said film data is read.

7. The multiple speed film drive according to claim 6, wherein said reading means comprises a photoreflective device adapted to optically read film data stored on said recording medium.

8. The multiple speed film drive according to claim 7, wherein said recording medium is a disk and said film data is recorded in bar code form on said disk.

9. The multiple speed film drive according to claim 6, wherein said reading means comprises a magnetic head to read magnetically recorded film data on said recording medium.

10. A multiple speed film drive according to claim 6, wherein said first speed is slower than said second speed.

11. A method for driving a film cartridge, comprising the steps of:

inserting a film cartridge containing film and having film data recorded thereon in a camera;

driving a spool axis of said film cartridge, at a first speed in a film rewind direction;

reading film data recorded on said film cartridge while said spool axis is driven at said first speed in said film rewind direction; and driving said spool axis at a second speed in a film feeding direction after said film data has been read.

12. A method of driving a film cartridge according to claim 11, wherein said first speed is slower than said second speed.

* * * * *